(12) United States Patent
Bortoli et al.

(10) Patent No.: US 12,313,123 B2
(45) Date of Patent: May 27, 2025

(54) MECHANICAL ASSEMBLY INCLUDING A ROLLER BEARING

(71) Applicant: DANA ITALIA S.R.L., Trentino (IT)

(72) Inventors: Andrea Bortoli, Arco (IT); Marco Scopesi, Arco (IT); Luca Gambini, Arco (IT)

(73) Assignee: DANA ITALIA S.R.L., Arco (IT)

( * ) Notice: Subject to any disclaimer, the term of this patent is extended or adjusted under 35 U.S.C. 154(b) by 126 days.

(21) Appl. No.: 18/303,882

(22) Filed: Apr. 20, 2023

(65) Prior Publication Data

US 2023/0340995 A1 Oct. 26, 2023

(30) Foreign Application Priority Data

Apr. 22, 2022 (DE) .................... 20 2022 102 151.1

(51) Int. Cl.
*F16C 33/66* (2006.01)
*F16C 19/28* (2006.01)

(52) U.S. Cl.
CPC .......... *F16C 33/6681* (2013.01); *F16C 19/28* (2013.01)

(58) Field of Classification Search
CPC ...... F16C 33/6681; F16C 19/28; F16C 33/66; F16N 7/14
See application file for complete search history.

(56) References Cited

U.S. PATENT DOCUMENTS

| 7,963,875 | B2 * | 6/2011 | Hilker | F16H 57/0483 475/160 |
| 9,772,026 | B2 * | 9/2017 | Fast | F16H 57/0423 |
| 2012/0213460 | A1 * | 8/2012 | Radinger | F16C 19/54 384/477 |
| 2014/0187374 | A1 * | 7/2014 | Murakami | F16C 33/6674 475/160 |

(Continued)

FOREIGN PATENT DOCUMENTS

| DE | 102016105109 A1 * | 9/2016 | ............ F16C 19/364 |
| JP | 2003185001 A | 7/2003 | |
| JP | 2013050147 A | 3/2013 | |

OTHER PUBLICATIONS

JP2013050147—Machine Translation (Year: 2013).*

*Primary Examiner* — Michael A Riegelman
(74) *Attorney, Agent, or Firm* — McCoy Russell LLP

(57) ABSTRACT

The present document relates to a mechanical assembly, comprising:
a first roller bearing including an inner race, an outer race and a plurality of rolling elements, wherein an axis of rotation of the first roller bearing defines a first axial direction oriented horizontally or inclined with respect to the vertical direction,
a source of lubricant configured to deliver lubricant to the first roller bearing, and at least one movable element disposed adjacent to the first roller bearing on a first side of the first roller bearing in the first axial direction, (Continued)

wherein the rolling elements of the first roller bearing are tapered and their larger diameter ends point towards the at least one movable element, and/or wherein axes of rotation of the rolling elements of the first roller bearing are inclined with respect to the first axial direction so that centrifugal forces generated inside the first roller bearing are configured to transport lubricant towards the at least one movable element.

20 Claims, 6 Drawing Sheets

(56) References Cited

U.S. PATENT DOCUMENTS

| | | | |
|---|---|---|---|
| 2015/0285224 A1* | 10/2015 | Hambrecht | F03D 17/00 29/898.07 |
| 2023/0340995 A1* | 10/2023 | Bortoli | F16C 19/28 |
| 2024/0110623 A1* | 4/2024 | Dallapiccola | F16H 57/0409 |

* cited by examiner

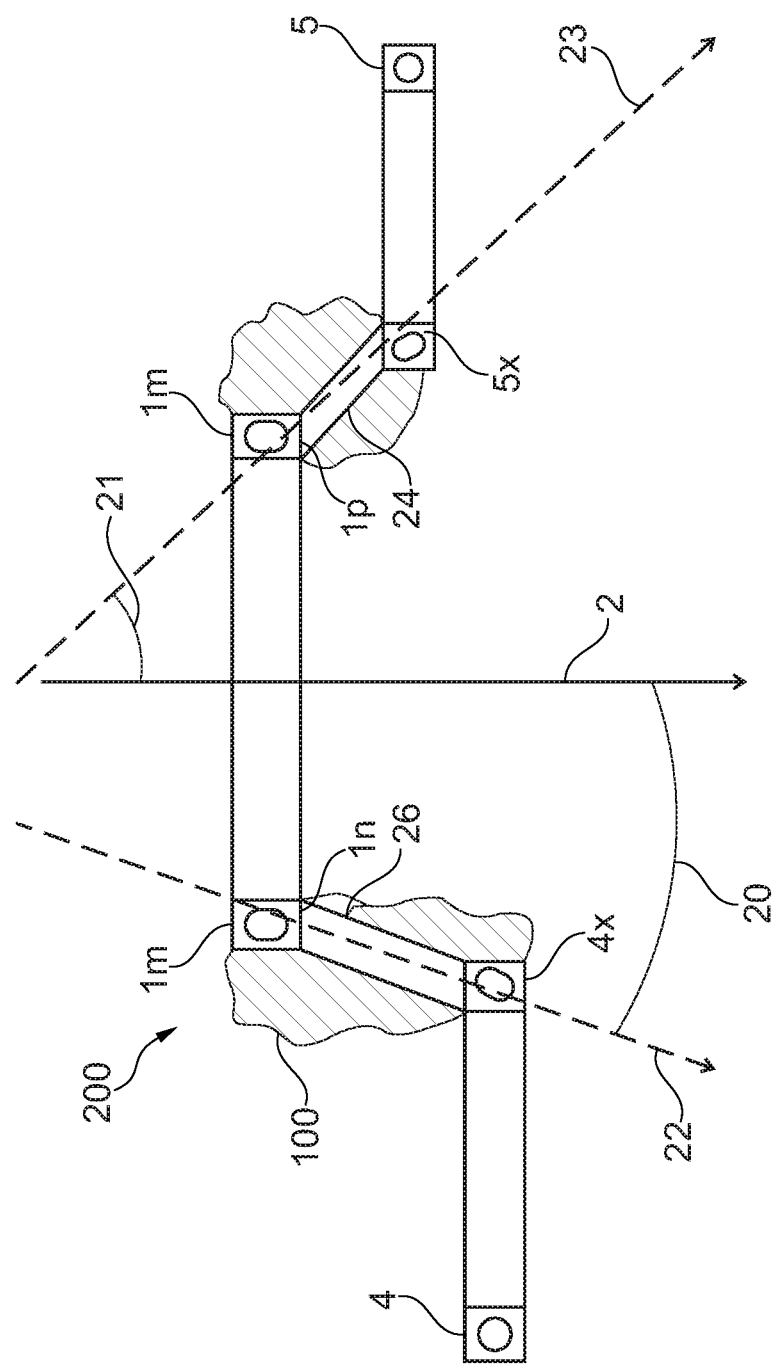

MECHANICAL ASSEMBLY INCLUDING A ROLLER BEARING

CROSS-REFERENCE TO RELATED APPLICATION

The present application claim priority to German Utility Model Application No. 20 2022 102 151.1, entitled "MECHANICAL ASSEMBLY INCLUDING A ROLLER BEARING", filed Apr. 22, 2022. The entire contents of the above-listed application is hereby incorporated by reference for all purposes.

TECHNICAL FIELD

The present disclosure relates to the field of mechanical engineering, more specifically to a mechanical assembly including a roller bearing. Mechanical assemblies of this kind may be used in automotive transmissions, for example.

BACKGROUND AND SUMMARY

In transmissions, rotating parts including bearings usually require regular lubrication in order to reduce friction and wear and improve long term stability. Generally, the principles of passive and active lubrication are well known. Passive lubrication typically relies on lubricant being recirculated by rotating components themselves. By contrast, active lubrication usually uses dedicated oil channels for pumping a liquid lubricant to rotating components. Active lubrication typically further requires an energy source such as a pump for transporting the lubricant. Passive lubrication systems typically require careful design, planning and experimental tuning. Active lubrication systems, on the other hand, are often costly in production and maintenance. In practice, many lubrication systems rely on passive lubrication wherein rotating components are at least partially submersed in a lubricant such as in a lubricant sump. For example, the rotating components may circulate or splash lubricant to components which are not themselves submersed in the lubricant.

A disadvantage of passive lubrication systems is that some components may be lubricated only randomly and with low efficiency and that the lubricant may be churned.

U.S. Pat. No. 7,963,875B2 discloses a power transmitting assembly with a differential gearset in a differential case and with a roller bearing at each end of the casing with tapered rolling elements wherein the bearings generate a flow of lubricant.

JP2013050147A and JP2003185001A mention that tapered roller bearings may generate a flow of lubricant.

Based on the prior art, there is demand for lubrication systems current which provide lubrication reliably and efficiently.

A mechanical assembly which meets these aims is defined herein. Special embodiments are described in the dependent claims.

The presently proposed mechanical assembly comprises:
a first roller bearing including an inner race, an outer race and a plurality of rolling elements, wherein an axis of rotation of the first roller bearing defines a first axial direction oriented horizontally or inclined with respect to the vertical direction (with vertical being with respect to gravity when the transmission is in a vehicle on level ground),
a source of lubricant configured to deliver lubricant to the first roller bearing, and
at least one movable element disposed adjacent to the first roller bearing on a first side of the first roller bearing in the first axial direction,
wherein the rolling elements of the first roller bearing are tapered and their larger diameter ends point towards the at least one movable element, and/or
wherein axes of rotation of the rolling elements of the first roller bearing are inclined with respect to the first axial direction.

Movement of the races and rolling elements of the first roller bearing relative to one other may distribute and transport the lubricant along the circumference of the first roller bearing. For example, when the axis of rotation of the first roller bearing extends along the horizontal direction, rotation of the first roller bearing may transport lubricant in the vertical direction. The vertical direction is the direction along which the gravitational force acts. In addition, centrifugal forces in the first roller bearing may distribute and transport lubricant in the first axial direction. As the rolling elements of the first roller bearing are either tapered and/or their axes of rotation are inclined with respect to the axis of rotation of the first roller bearing, a component of centrifugal force at the surfaces of the rolling elements acts in the direction of the axis of rotation of the first roller bearing. In this manner, the first roller bearing is configured to distribute lubricant in the vertical direction and in the first axial direction, which may extend horizontally or which may be inclined with respect to the vertical direction.

The source of lubricant may be configured to deliver lubricant to a lower half of the first roller bearing. For example, the source of lubricant may include a lubricant sump. At least a portion of the first roller bearing may then be immersed in the lubricant sump. In this way, the rolling elements of the first roller bearing may be fully or at least partially immersed in the lubricant so that they may lift or transport lubricant to the upper half of the first roller bearing.

The at least one movable element may include at least one further bearing. The at least one further bearing may include at least one roller bearing including a plurality of rolling elements. The rolling elements of the further bearings may be configured to transport and/or distribute lubricant, for example by splashing. An axis of rotation of the at least one further bearing may be arranged in parallel to the first axial direction. An axis of rotation of the at least one further bearing may be disposed at a distance from the axis of rotation of the first roller bearing.

The first roller bearing and the at least one further bearing may be disposed and arranged in such a way that a projection of an annular space formed between the inner race and the outer race of the first roller bearing onto a plane perpendicular to the first axial direction overlaps with a projection of an annular space formed between an inner race and an outer race of the at least one further bearing onto said plane. In this manner, lubricant may be transported or pumped from inside the first roller bearing toward the at least one further bearing for lubricating the at least one further bearing.

The mechanical assembly may include a cover disposed on the first side of the first roller bearing, wherein the cover closes or at least partially closes an annular space formed between the inner race and the outer race of the first roller bearing on its first side. For example, the mechanical assembly may include a housing. The first roller bearing, the at least one movable element and/or the source of lubricant may be disposed within the housing. The cover may then be a portion of the housing. Or in other words, the housing may be shaped and arranged such that it closes or at least partially closes the first roller bearing on its first side. As mentioned above, the first roller bearing is configured to create a flow of lubricant toward the one or more movable elements. Thus, sealing and/or closing the first roller bearing on the side of the first roller bearing facing the one or more movable elements may allow the lubricant to be actively guided in a desired direction.

To that end, the cover may comprise at least one opening. The at least one opening in the cover may be disposed such that an annular space formed between an inner race and an outer race of the at least one further bearing intersects with a cone, the cone having an apex located at or within the at least one opening in the cover, the cone having a cone axis arranged in parallel to the first axial direction, and the cone having an opening angle of less than 70 degrees, of less than 50 degrees, or of less than 35 degrees, for example. The cone is then arranged such that the larger diameter portion of the cone points from the first roller bearing toward the at least one further bearing. Via the at least one opening in the cover, lubricant from the first roller bearing may be transported and/or distributed to the at least one further bearing in an efficient and targeted manner.

The at least one opening may include a plurality of openings having different sizes. For instance, the at least one opening may include a first opening and a second opening, wherein the first opening is disposed above the second opening along the vertical direction and wherein a size of the first opening is larger than a size of the second opening. As a hydrostatic pressure of the lubricant is usually higher at the location of the second, lower lying opening, the diameter or size of the second, lower lying opening may be smaller than the diameter or size of the first opening located above the second opening in order to generate an equal flow of lubricant through both openings. Or in other words, the sizes of the different openings can be chosen such that a flow of lubricant through the different openings has a similar strength or intensity.

The mechanical assembly may include a first shaft and a first gear mounted on the first shaft, wherein the first shaft is supported by the first roller bearing. Along the first axial direction, the first gear may be disposed on the first side of the first roller bearing. The mechanical assembly may further include a second shaft and a second gear mounted on the second shaft, wherein the second gear is drivingly engaged with or in mesh with the first gear. The second shaft may be supported by at least one second bearing, for example.

The mechanical assembly may include a terminal bearing disposed on the first side of the first roller bearing along the first axial direction. The terminal bearing may be arranged coaxially with the first roller bearing. The at least movable element may include at least one further bearing disposed in between the first roller bearing and the terminal bearing along the first axial direction.

The terminal bearing may include a roller bearing including a plurality of rolling elements. The rolling elements of the terminal bearing may be tapered or may have a conical shape. Axes of rotation of the tapered rolling elements of the terminal bearing may be inclined with respect to an axis of rotation of the terminal bearing. The rolling elements of the terminal bearing may be configured to transport lubricant from inside the terminal bearing towards the first roller bearing.

An embodiment of the presently proposed mechanical assembly is described in the following detailed description with reference to the figures.

BRIEF DESCRIPTION OF THE FIGURES

FIG. 6 schematically shows another sectional view of the mechanical assembly of FIGS. 1 to 5.

DETAILED DESCRIPTION

Figure 1:
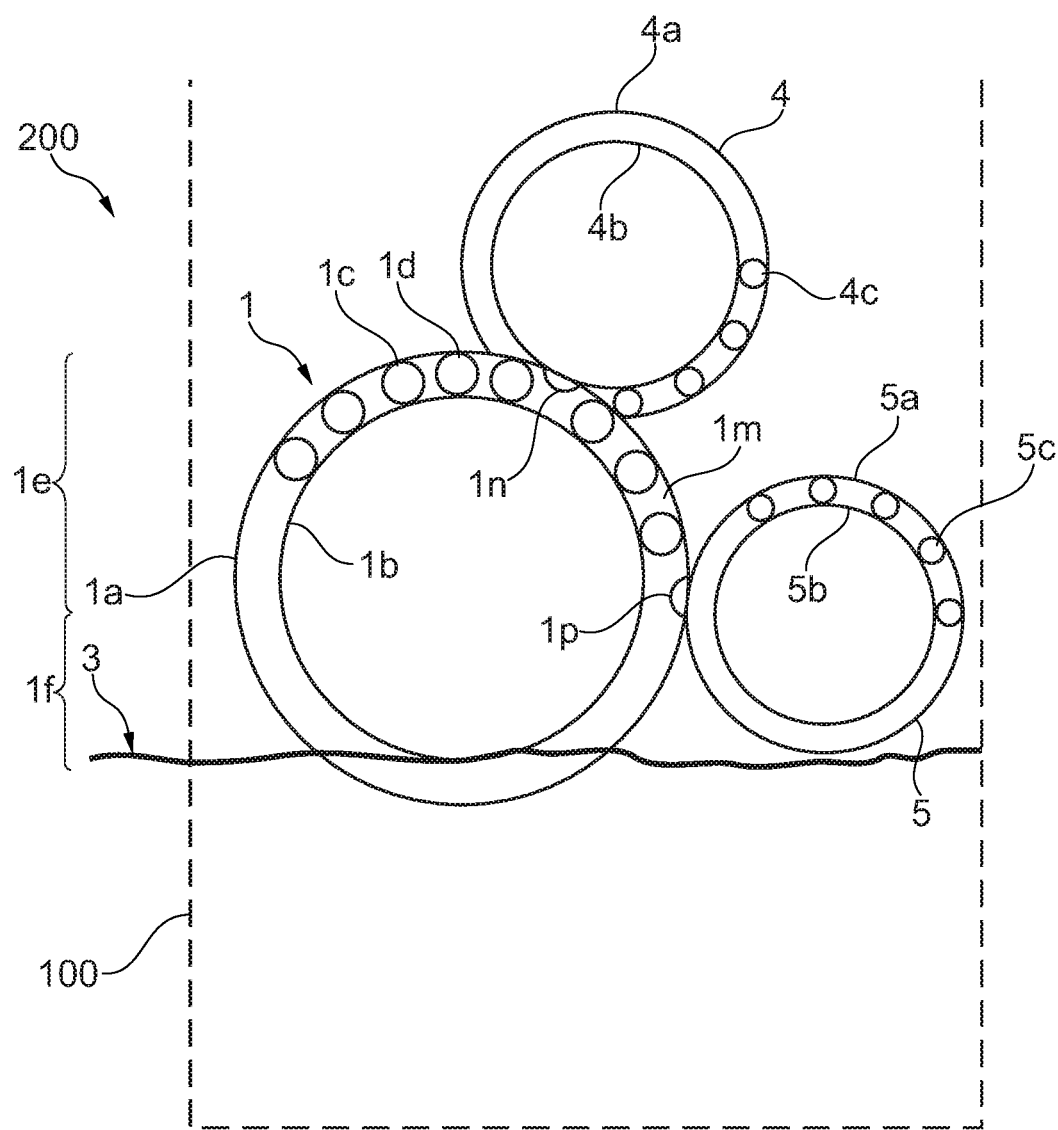
FIG. 1 schematically shows a front view of elements of a mechanical assembly including three roller bearings.

FIG. 1 shows, in a schematic front view, a mechanical assembly 200 of the presently proposed type. The assembly 200 includes a first roller bearing 1 comprising an inner race 1b, an outer race 1a and a plurality of rolling elements 1c, 1d inside an annular space 1m extending between the inner race 1b and the outer race 1a. The first roller bearing 1 has an upper portion 1e and a lower portion 1f. The lower half 1f is immersed in a lubricant sump 3 formed in a lower part of a housing 100. The lubricant sump 3 may be filled or at least partially filled with a lubricant such as oil. In FIG. 1, the first roller bearing 1 is positioned in the foreground, as can be better observed FIG. 2. Here and in all of the following, recurring features depicted in different figures are designated with the same reference signs. An axis of rotation 2 of the first roller bearing 1 is oriented horizontally and perpendicular to the plane of projection of FIG. 1. The axis of rotation 2 of the first roller bearing 1 is more clearly illustrated in FIG. 2 and is represented by an arrow defining a first axial direction.

Figure 2:
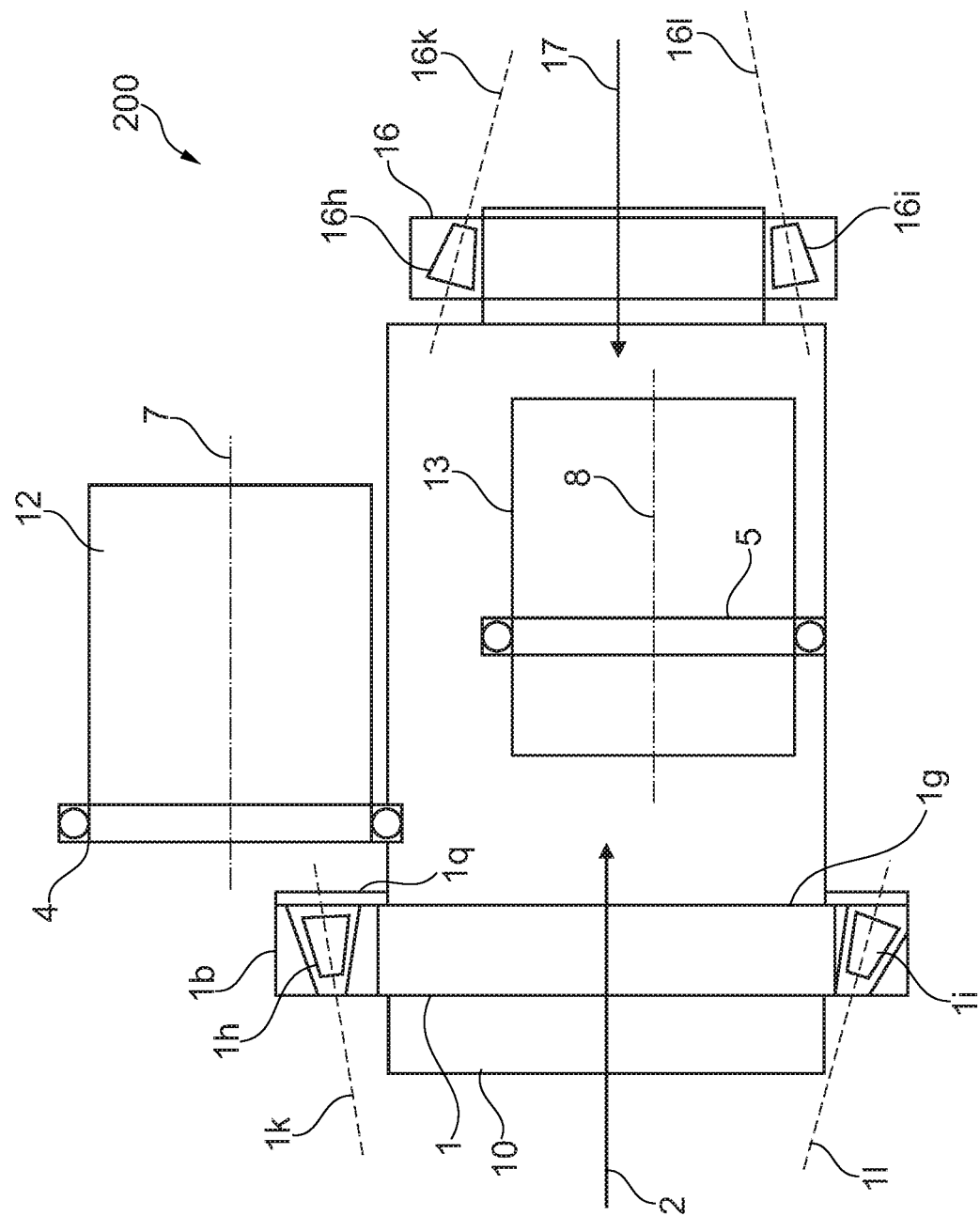
FIG. 2 schematically shows a side view of the mechanical assembly of FIG. 1.

FIG. 1 further shows a second roller bearing 4 comprising an outer race 4a, an inner race 4b and a plurality of rolling elements 4c, and a third roller bearing 5 comprising an outer race 5a, an inner race 5b and a plurality of rolling elements 5c. FIG. 2 illustrates that rolling elements 1h and 1i of the first roller bearing 1 are formed by tapered or conical bodies with their larger diameter end oriented towards the first axial direction 2 and towards the second roller bearing 4 and toward the third roller bearing 5.

FIG. 1 illustrates that a lower lying portion of the first roller bearing 1 is submersed in the lubricant sump 3. Consequently, as the first roller bearing 1 rotates the rolling elements and the moving race pass through the lubricant sump 3, thereby transporting or lifting lubricant to the upper portion 1e of the first bearing 1. At the same time, as the tapered rolling elements 1c, 1d, 1h, 1i of the first roller bearing 1 rotate, centrifugal forces push lubricant disposed on or wetting the surface of the rolling elements 1c, 1d, 1h, 1i towards the larger diameter ends of the rolling elements 1c, 1d, 1h, 1i. In this way, lubricant is transported in the first axial direction 2 and from the first roller bearing 1 towards the second roller bearing 4 and the third roller bearing 5. Depending on the fill level of the lubricant sump 3, the second roller bearing 4 and the third roller bearing 5 may be disposed above the fill level of the lubricant sump 3, as indicated in FIG. 1, for example. In that case, lubricant from the lubricant sump 3 may be supplied to the second roller bearing 4 and to the third roller bearing 5 exclusively by the above-described pumping or transporting function effected by the rotating rolling elements 1c, 1d, 1h, 1i of the first roller bearing 1.

FIG. 2 further highlights that in addition to the tapered or conical shape of the rolling elements 1h, 1i of the first roller bearing 1 their axes of rotation 1k, 1l are inclined with respect to the first axial direction 2. More specifically, the axes 1*k*, 1*l* of the tapered or conical rolling elements 1*h*, 1*i* of the first roller bearing 1 are oriented in such a way that the axes of rotation of all rolling elements of the first roller bearing 1 form or are disposed on the surface of a cone whose diameter increases in the first axial direction 2. In this way, rotation of the first roller bearing 1 generates an additional centrifugal force acting on the lubricant disposed on or wetting the surfaces of the rolling elements of the first roller bearing 1. This additional force would be generated even in case the rolling elements of the first roller bearing 1 had a cylindrical shape rather than a tapered or conical shaped as in FIG. 2.

In FIG. 2, a first side 1*g* of the first roller bearing 1 faces the second bearing 4 and the third bearing 5. On the first side 1*g* of the first roller bearing, a cover 1*q* closes or at least partially closes the annular space 1*m* extending between the inner race 1*b* and the outer race 1*a* of the first roller bearing 1. For example, the cover 1*q* may be formed by a portion of the housing 100 schematically shown in FIG. 1. The cover 1*q* prevents lubricant from moving in the first axial direction 2 toward the second bearing 4 and/or toward the third bearing 5.

In order to guide lubricant out of the space 1*m* in the first axial direction 2 in a targeted manner, the cover 1*q* features openings 1*n*, 1*p*. The opening 1*n* is disposed or positioned in an area where a projection of the annular space 1*m* between the inner race 1*b* and the outer race 1*a* of the first roller bearing 1 onto a plane perpendicular to the first axial direction overlaps or intersects with a projection of an annular space formed or extending between the inner race 4*b* and the outer race 4*a* of the second bearing 4 onto the same plane. And the opening 1*p* is disposed or positioned in an area where a projection of the annular space 1*m* between the inner race 1*b* and the outer race 1*a* of the first roller bearing 1 onto a plane perpendicular to the first axial direction overlaps or intersects with a projection of an annular space formed or extending between the inner race 5*b* and the outer race 5*a* of the third bearing 5 onto the same plane. The openings 1*n*, 1*p* may have different sizes or cross sections. For instance, the opening 1*n* which is positioned above the opening 1*p* along the vertical direction may have a larger size or a larger cross section than the opening 1*p*. In this manner, the same or similar amounts of lubricant may be supplied from the first roller bearing 1 to the second bearing 4 and to the third bearing 5, for example.

Further, FIG. 2 illustrates axes of rotation 7, 8 of the second and third bearings 4, 5, respectively. The axes 7, 8 are arranged in parallel to the axis of rotation 2 of the first roller bearing 1. The bearings 1, 4, 5 each support a shaft 10, 12, 13, respectively. A perspective view of the shafts 10, 12, 13 is depicted in FIG. 3.

The mechanical assembly 200 further includes a terminal bearing 16. The terminal bearing 16 is disposed opposite the first roller bearing 1 and on the first side of the first roller bearing 1. The terminal bearing 16 is coaxially aligned with the first roller bearing 1, so that the axes of rotation 2, 17 of the first roller bearing 1 and of the terminal bearing 17 coincide. Along the axial direction 2, the bearings 4, 5 are located in between the first roller bearing 1 and the terminal bearing 16. The mechanical assembly 200 further includes a shaft 10 which is supported by the first roller bearing 1 and by the terminal bearing 16.

The rolling elements 16*h*, 16*i* of the terminal bearing 16 have a tapered or conical shape. The axes of rotation 16*k*, 16*l* of the rolling elements 16*h*, 16*i* of the terminal bearing 16 are inclined with respect to the axis of rotation 17 of the terminal bearing 16. The larger diameter ends of the tapered rolling elements 16*h*, 16*i* point towards the first roller bearing 1. Further, the axes of rotation 16*k*, 16*l* of the rolling elements of the terminal bearing 16 are oriented such that they are disposed on or form the surface of a cone, wherein the tip of the cone points in the first axial direction 2 and away from the first roller bearing 1. Consequently, when the terminal bearing 16 rotates and the terminal bearing 16 is at least partially immersed in the lubricant sump 3, axial forces generated by the terminal bearing 16 act on the lubricant disposed on or wetting the surface of the rolling elements 16*h*, 16*i* of the terminal bearing 16 in the same way as described above with reference to the rolling elements 1*h*, 1*i* of the first roller bearing 1. These forces acting on the lubricant inside the terminal bearing 16 are directed towards the first roller bearing 1 and force or push lubricant toward the first roller bearing 1.

Figure 3:
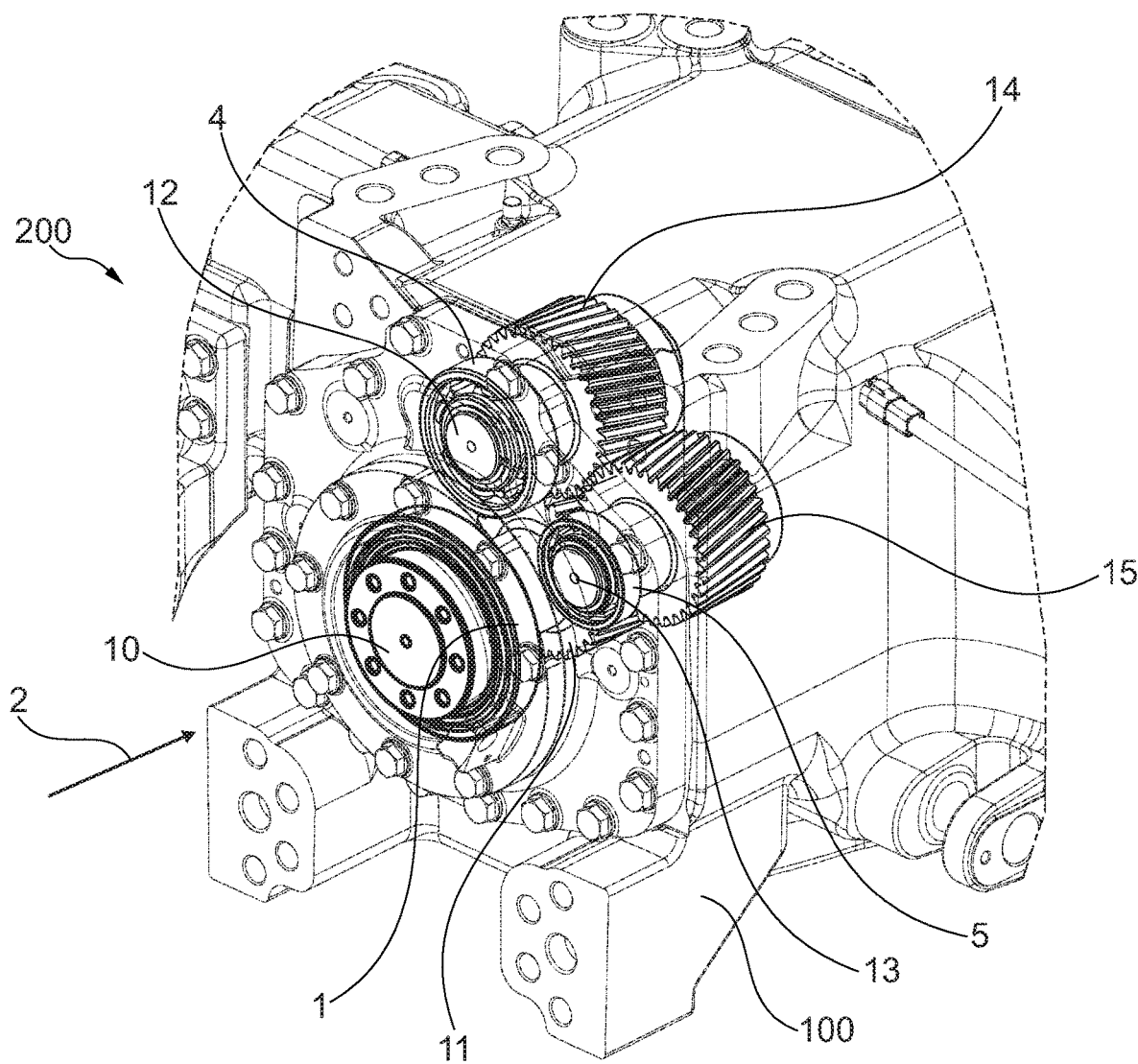
FIG. 3 schematically shows a perspective view of the mechanical assembly of FIGS. 1 and 2.
Figure 4:
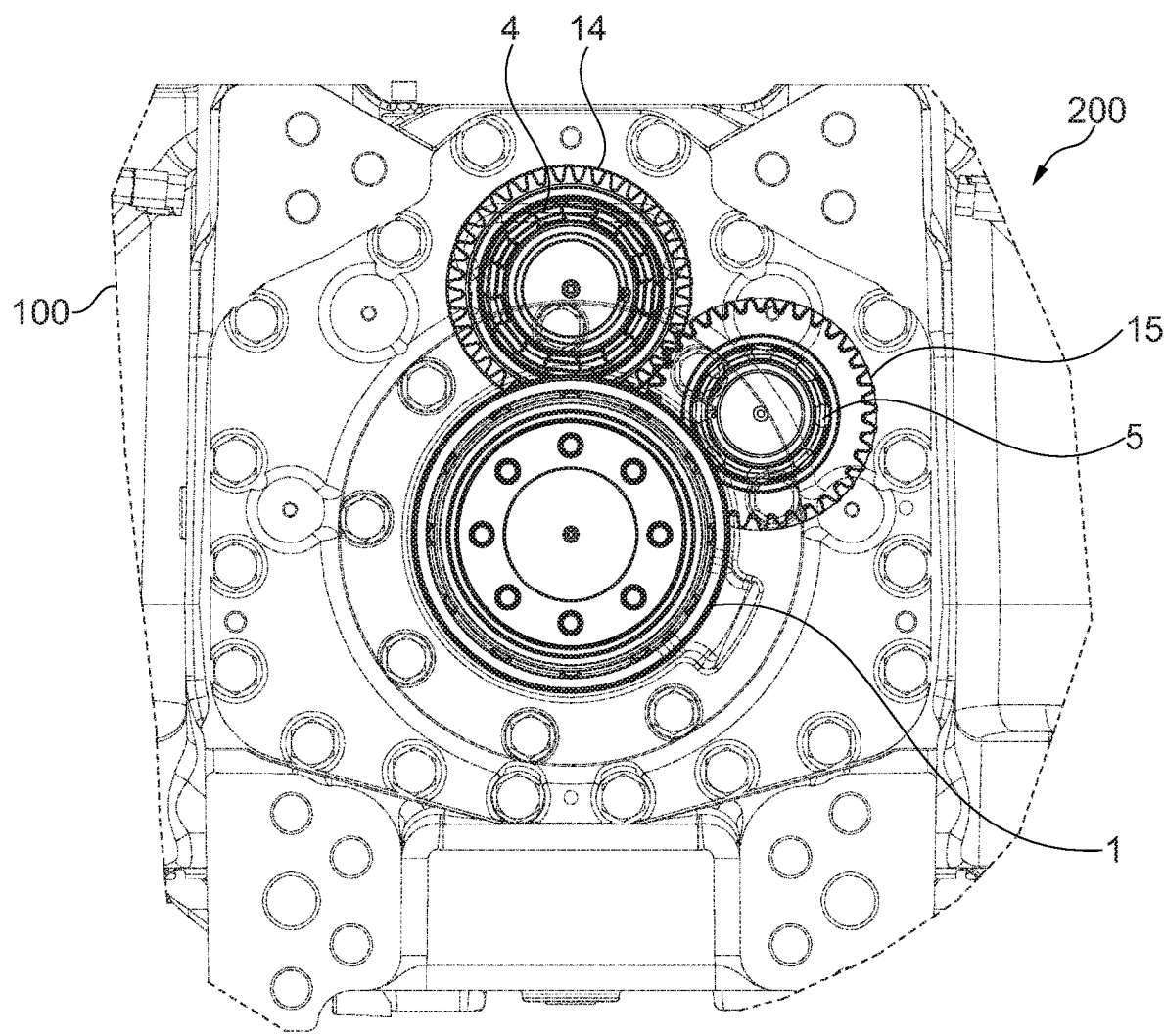
FIG. 4 schematically shows another front view of the mechanical assembly of FIGS. 1 to 3, further depicting shafts and gears mounted on the shafts.

FIG. 3 shows a perspective view of the assembly 200, wherein the first roller bearing 1 supports a first shaft 10, the second bearing 4 supports a second shaft 12, and the third bearing 5 supports a third shaft 13. A first gear 11 is mounted on the first shaft 10, a second gear 14 is mounted on the second shaft 12, and a third gear 15 is mounted on the third shaft 13. The two gears 14, 15 are in mesh with one another, and one of the gears 14, 15 is in mesh with the first gear 11 mounted on the first shaft 10. As before, the arrow 2 represents the first axial direction. FIG. 4 shows a front view of the assembly 200 depicting the three bearings 1, 4, 5 and the gears 14, 15 disposed.

Figure 5:
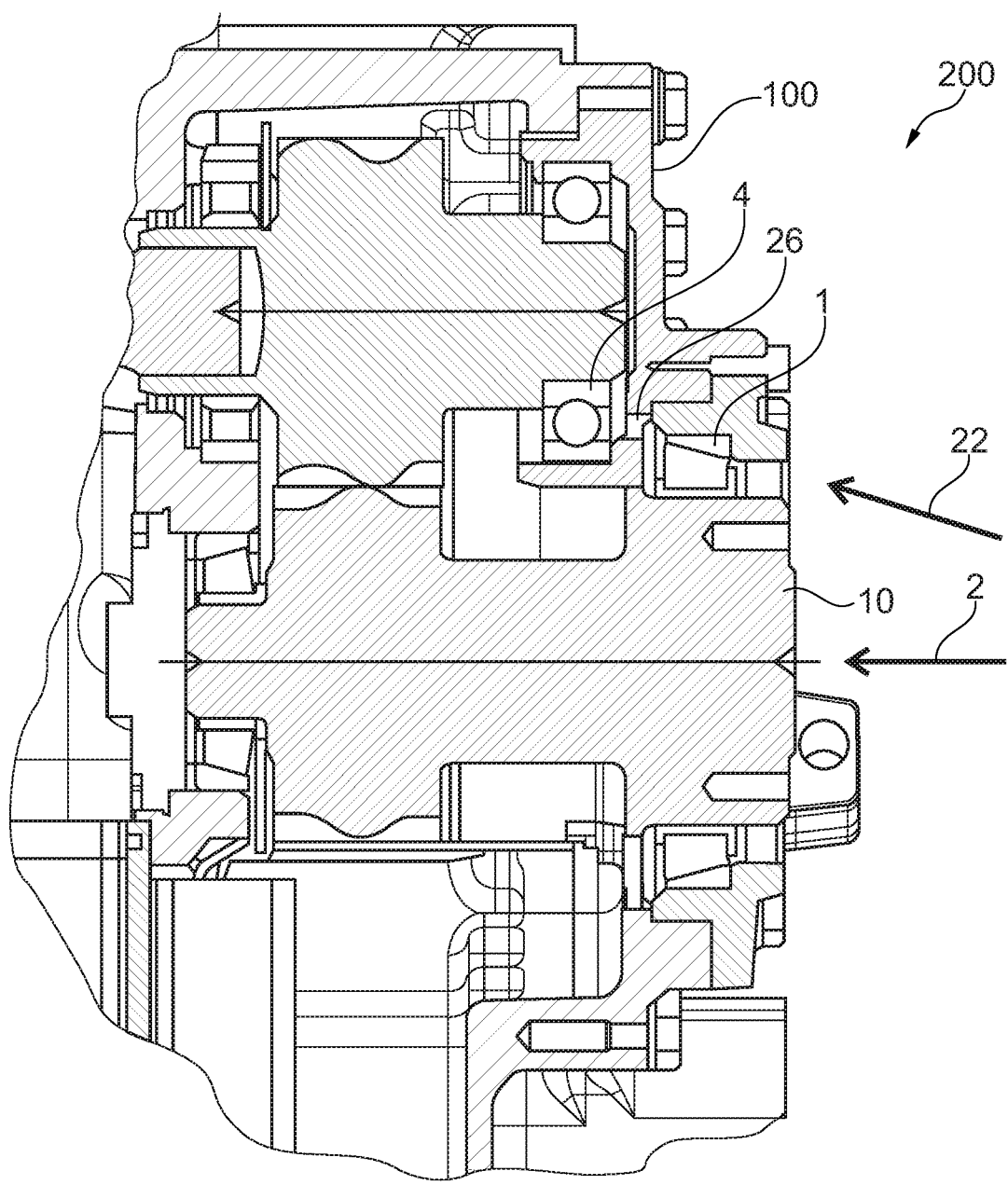
FIG. 5 schematically shows another sectional view of the mechanical assembly of FIGS. 1 to 4.

FIG. 5 shows a sectional view of the mechanical assembly 200 including the first roller bearing 1 and the second roller bearing 4, wherein the plane of projection includes an axis of rotation of the bearings 1 and 4. Again, the first axial direction is represented by the arrow 2. With the viewing direction pointing in the first axial direction 2, the second bearing 4 is positioned behind the first roller bearing 1. The assembly 200 includes a metallic block which forms a channel or chamber 26 disposed in between the first roller bearing 1 and the second bearing 4. In a region where projections of the bearings 1 and 4 onto a plane perpendicular to the first axial direction 2 overlap, lubricant can flow from the first roller bearing 1 to the second bearing 4 via the channel or chamber 26 in a direction represented by an arrow 22. Here, the direction 22 and the first axial direction 2 enclose an angle of less than 30 degrees.

FIG. 6 schematically shows another sectional view including details of the mechanical assembly 200 including the first roller bearing 1, the second bearing 4 and the third bearing 5, wherein the second and third bearings 4, 5 are positioned behind the first roller bearing 1 along the first axial direction 2.

Connection channels 24, 26 fluidly connect the space 1*m* formed between the inner race and the outer race of the first roller bearing 1 and accommodating the rolling elements of the first roller bearing 1 with a space 4*x* formed between an inner race and an outer race of the second bearing 4 and accommodating rolling elements of the second bearing 4, and with a space 5*x* formed between an inner race and an outer race of the third bearing 5 and accommodating rolling elements of the third bearing 5, respectively. In this manner, the rolling elements of the first roller bearing 1 may transport and/or distribute lubricant from disposed on or wetting a surface of the rolling elements of the first roller bearing to the second and third roller bearings 4, 5 via the connection channels 24, 26. As indicated in FIG. 6, the connection channels 24, 26 may be formed within or may be shaped by the housing 100. The housing 100 closes the space 1*m* on a side of the first roller bearing facing the second and third bearings 4, 5. Openings 1*n* and 1*p* in the portion of the housing 100 closing the space 1*m* provide fluid communication between the space 1*m* and the connection channels 24, 26.

The opening 1*n* and the second bearing 4 are disposed and arranged in such a way that the space 4*x* formed between the races of the second bearing 4 intersects with a first cone whose apex is located at or within the opening 1*n*, whose cone axis is arranged in parallel to the rotation axis 2 of the first roller bearing 1, and which has an opening angle of at most 40 degrees, as indicated by a longitudinal axis 22 of the channel 26 and an angle 20 between the longitudinal axis 22 and the rotation axis 2 of the first roller bearing 1, wherein the angle 20 amounts to one half of the opening angle of the first cone. Similarly, the opening 1*p* and the third bearing 5 are disposed and arranged in such a way that the space 5*x* formed between the races of the third bearing 5 intersects with a second cone whose apex is located at or within the opening 1*p*, whose cone axis is arranged in parallel to the rotation axis 2 of the first roller bearing 1, and which has an opening angle of at most 70 degrees, as indicated by a longitudinal axis 23 of the channel 24 and an angle 10 between the longitudinal axis 23 and the rotation axis 2 of the first roller bearing 1, wherein the angle 21 amounts to one half of the opening angle of the second cone. FIGS. 3-5 are drawn to scale, although other relative dimensions may be used if desired.

The invention claimed is:

1. A mechanical assembly, comprising:
a first roller bearing including an inner race, an outer race and a plurality of rolling elements, wherein an axis of rotation of the first roller bearing defines a first axial direction oriented horizontally or inclined with respect to the vertical direction,
a source of lubricant configured to deliver lubricant to the first roller bearing, and
at least one movable element disposed adjacent to the first roller bearing on a first side of the first roller bearing in the first axial direction,
wherein the rolling elements of the first roller bearing are tapered and their larger diameter ends point towards the at least one movable element, and/or
wherein axes of rotation of the rolling elements of the first roller bearing are inclined with respect to the first axial direction so that centrifugal forces generated inside the first roller bearing are configured to transport lubricant towards the at least one movable element, and
wherein the mechanical assembly further includes a cover disposed on the first side of the first roller bearing, the cover closing or at least partially closing an annular space formed between the inner race and the outer race of the first roller bearing on its first side, the cover comprising at least one opening disposed such that an annular space formed between an inner race and an outer race of the at least one further bearing intersects with a cone, the cone having an apex located at or within the at least one opening, the cone having a cone axis arranged in parallel to the first axial direction, and the cone having an opening angle of less than 70 degrees.

2. The mechanical assembly according to claim 1, wherein the source of lubricant is arranged to deliver lubricant to a lower half of the first roller bearing.

3. The mechanical assembly according to claim 1, wherein the source of lubricant includes a lubricant sump, wherein at least a portion of the first roller bearing is immersed in the lubricant sump.

4. The mechanical assembly according to claim 1, wherein the at least one movable element includes at least one further bearing.

5. The mechanical assembly according to claim 4, wherein the at least one further bearing includes at least one roller bearing including rolling elements.

6. The mechanical assembly according to claim 4, wherein an axis of rotation of the at least one further bearing is arranged in parallel to the first axial direction.

7. The mechanical assembly according to claim 6, wherein an axis of rotation of the at least one further bearing is disposed at a distance from the axis of rotation of the first roller bearing.

8. The mechanical assembly according to claim 4, wherein a projection of an annular space formed between the inner race and the outer race of the first roller bearing onto a plane perpendicular to the first axial direction overlaps with a projection of an annular space formed between an inner race and an outer race of the at least one further bearing onto said plane.

9. The mechanical assembly according to claim 1, further including a first shaft and a first gear mounted on the first shaft, wherein the first shaft is supported by the first roller bearing.

10. The mechanical assembly according to claim 9, further including a second shaft and a second gear mounted on the second shaft, wherein the second gear is drivingly engaged with or in mesh with the first gear.

11. The mechanical assembly according to claim 10, wherein the first gear is disposed on the first side of the first roller bearing in the first axial direction.

12. The mechanical assembly according to claim 10, further including a terminal bearing disposed on the first side of the first roller bearing and arranged coaxially with the first roller bearing, wherein the at least movable element includes at least one further bearing disposed in between the first roller bearing and the terminal bearing along the first axial direction.

13. The mechanical assembly according to claim 12, wherein the terminal bearing includes roller bearing including a plurality of rolling elements.

14. The mechanical assembly according to claim 13, wherein the rolling elements of the terminal bearing are tapered, wherein axes of rotation of the tapered rolling elements of the terminal bearing are inclined with respect to an axis of rotation of the terminal bearing.

15. The mechanical assembly according to claim 13, wherein the rolling elements of the terminal bearing are configured to transport lubricant from inside the terminal bearing towards the first roller bearing.

16. A mechanical assembly, comprising:
a first roller bearing including an inner race, an outer race and a plurality of rolling elements, wherein an axis of rotation of the first roller bearing defines a first axial direction oriented horizontally or inclined with respect to the vertical direction,
a source of lubricant configured to deliver lubricant to the first roller bearing, and
at least one movable element disposed adjacent to the first roller bearing on a first side of the first roller bearing in the first axial direction,
wherein the rolling elements of the first roller bearing are tapered and their larger diameter ends point towards the at least one movable element, and/or wherein axes of rotation of the rolling elements of the first roller bearing are inclined with respect to the first axial direction so that centrifugal forces generated inside the first roller bearing are configured to transport lubricant towards the at least one movable element, and wherein the mechanical assembly further includes a cover disposed on the first side of the first roller bearing, the cover closing or at least partially closing an annular space formed between the inner race and the outer race of the first roller bearing on its first side, the cover comprising a plurality of openings having different sizes.

17. The mechanical assembly according to claim 16, wherein the plurality of openings includes at least a first opening of a first size and a second opening of a second size, the second size smaller than the first size.

18. The mechanical assembly according to claim 17, wherein the first size is configured to supply an amount of lubricant to a first movable element of the at least one movable element positioned at a first distance from the first opening, and the second size is configured to supply the amount of lubricant to a second movable element of the at least one movable element positioned at a second distance from the second opening.

19. A mechanical assembly, comprising:
a first roller bearing including an inner race, an outer race and a plurality of rolling elements, wherein an axis of rotation of the first roller bearing defines a first axial direction oriented horizontally or inclined with respect to the vertical direction,
a source of lubricant configured to deliver lubricant to the first roller bearing, and
at least one movable element disposed adjacent to the first roller bearing on a first side of the first roller bearing in the first axial direction, wherein the rolling elements of the first roller bearing are tapered and their larger diameter ends point towards the at least one movable element, and/or wherein axes of rotation of the rolling elements of the first roller bearing are inclined with respect to the first axial direction so that centrifugal forces generated inside the first roller bearing are configured to transport lubricant towards the at least one movable element, and wherein the mechanical assembly further includes a cover disposed on the first side of the first roller bearing, the cover closing or at least partially closing an annular space formed between the inner race and the outer race of the first roller bearing on its first side, the cover comprising at least a first opening and a second opening, wherein the first opening is disposed above the second opening along the vertical direction and wherein a size of the first opening is larger than a size of the second opening.

20. The mechanical assembly according to claim 19, wherein the size of the first opening is configured to supply an amount of lubricant to a first movable element of the at least one movable element positioned at a first distance from the first opening, and the size of the second opening is configured to supply the amount of lubricant to a second movable element of the at least one movable element positioned at a second distance from the second opening.

* * * * *